(12) United States Patent
Georgis et al.

(10) Patent No.: US 7,694,884 B2
(45) Date of Patent: Apr. 13, 2010

(54) REMOVABLE CARTRIDGE IDENTIFICATION SYSTEM

(75) Inventors: Steven P. Georgis, Boulder, CO (US); Christopher Bukowski, Boulder, CO (US)

(73) Assignee: Prostor Systems, Inc., Boulder, CO (US)

( * ) Notice: Subject to any disclaimer, the term of this patent is extended or adjusted under 35 U.S.C. 154(b) by 791 days.

(21) Appl. No.: 11/279,083

(22) Filed: Apr. 7, 2006

(65) Prior Publication Data

US 2007/0235516 A1 Oct. 11, 2007

(51) Int. Cl.
*G06K 19/00* (2006.01)

(52) U.S. Cl. .................. 235/487; 235/462.01

(58) Field of Classification Search ............... 235/487, 235/462.01; 360/55, 69; 700/214
See application file for complete search history.

(56) References Cited

U.S. PATENT DOCUMENTS

| | | | |
|---|---|---|---|
| 5,303,034 A * | 4/1994 | Carmichael et al. | 356/620 |
| 5,568,455 A | 10/1996 | Balsom | |
| 6,138,909 A * | 10/2000 | Rockwell et al. | 235/383 |
| 6,154,790 A | 11/2000 | Pruett et al. | |
| 6,201,474 B1 * | 3/2001 | Brady et al. | 340/572.8 |
| 6,466,990 B2 * | 10/2002 | Frary | 719/310 |
| 7,010,647 B1 | 3/2006 | Karamchetty et al. | |
| 2002/0060870 A1 | 5/2002 | Teng et al. | |
| 2002/0144044 A1 | 10/2002 | Moon et al. | |
| 2004/0143703 A1 | 7/2004 | Emberty et al. | |
| 2005/0188246 A1 | 8/2005 | Emberty et al. | |

FOREIGN PATENT DOCUMENTS

| | | |
|---|---|---|
| EP | 1182660 A | 2/2002 |
| WO | WO 2005/004462 A | 1/2005 |
| WO | WO 2006/052752 A | 5/2006 |

* cited by examiner

*Primary Examiner*—Ahshik Kim
(74) *Attorney, Agent, or Firm*—Townsend and Townsend and Crew, LLP (57) ABSTRACT

A method for electronically providing identification of a removable data cartridge is disclosed. In one step, an identifier is programmed into the removable data cartridge. A command is received to provide a machine-readable marking from the removable data cartridge. An identifier is read from within the removable data cartridge. The machine-readable marking is determined using the identifier. Responding to the command with a response, where the response provides the machine-readable marking.

24 Claims, 9 Drawing Sheets

REMOVABLE CARTRIDGE IDENTIFICATION SYSTEM

BACKGROUND

This disclosure relates in general to removable data cartridges and, but not by way of limitation, to automated identification of removable data cartridges.

Tape cartridges are often coded with bar codes when they are sold to customers. These bar codes are used by tape libraries to inventory cartridges. These barcode labels are pre-printed with both industry-standard barcodes and human-readable equivalents and are normally affixed to one side of a data cartridge. The barcode values are used by some host computer data management applications to uniquely associate the location of stored data with a particular removable data cartridge. In particular, data backup/archive/restore applications maintain a database of which data was stored to which cartridges at which time in order to be able to properly retrieve data at a future date. The removable cartridges are identified by their barcode labels in the database. When it is necessary to restore data, the application will prompt the user or a cartridge automation system to load a particular cartridge based on a barcode value.

Prior art tape and optical library systems, which house numerous removable cartridges in off-line containers, include an optical barcode scanner mounted on a robotic arm or similar mechanical carousel assembly. Upon initialization of the system or receipt of a command to perform a cartridge inventory, the library scans the barcode label attached to the back of each cartridge by operating the robotic arm and/or carousel to mechanically scan past each cartridge. The inventory of barcode labels are then associated with the physical location of the data cartridge and stored in memory in the library system electronics. The cartridge barcode values may then be read by the host computer application to uniquely identify a particular cartridge.

Figure 1:
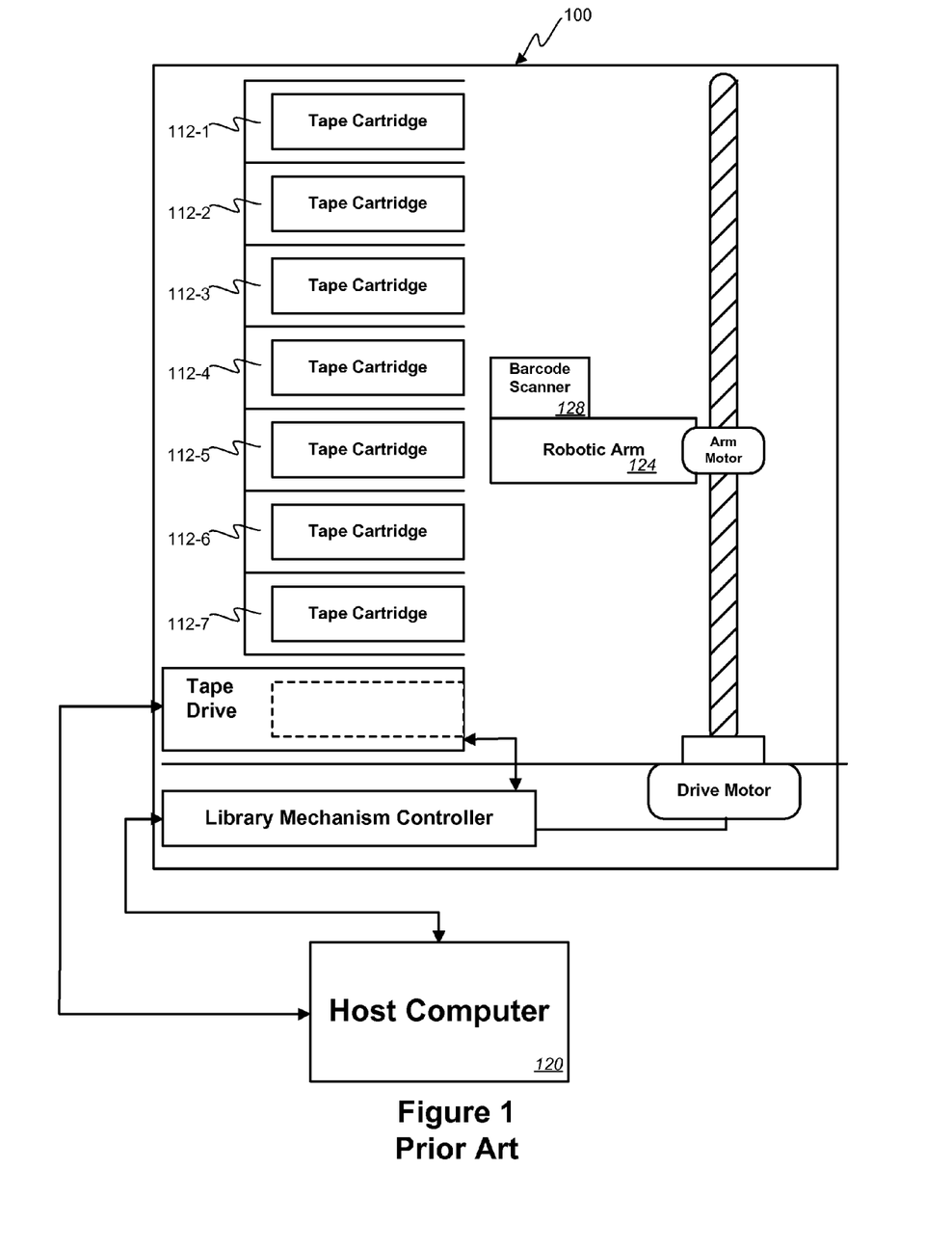
FIG. 1 depicts a prior art block diagram of a tape library coupled to a host computer.

As shown in FIG. 1, a tape library 100 has a robotic arm 124 that is movable to reach a number of tape cartridges that are inactively held in slots 112. The robotic arm 124 has a barcode scanner 128 attached that can be moved to each tape cartridge to read the bar code. The inventory of tape cartridges is returned from the tape library 100 to the host computer 120 that requested the inventory. The host computer 120 talks with the tape library using industry standard commands.

Often, users of tape cartridges update them with customized barcodes. These customized barcodes can be inventoried by a tape library just like those pre-printed on the tape cartridges. After the host computer receives the results from an inventory, application software can be updated with the new barcodes.

Tape cartridges can store information for the purposes of archive or other reasons. Application software that uses the tape cartridges can store an identifier onto the tape cartridge. If a barcode scanner is not available, recognizing the tape requires rewinding or fast forwarding the tape to find the spot where the identifier is stored. Once the identifier is eventually found, it can be returned to the application software.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 2:
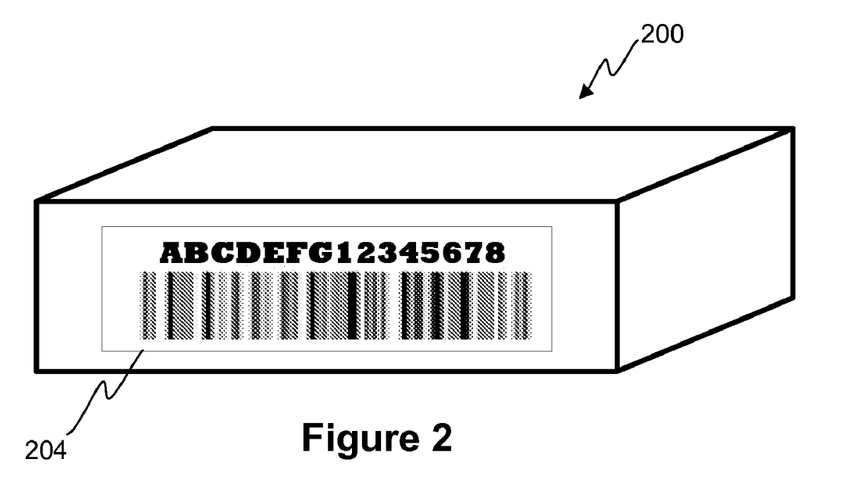
FIG. 2 depicts a perspective view of an embodiment of a data cartridge.

Referring first to FIG. 2, a perspective view of an embodiment of a data cartridge 200 is shown. This data cartridge 200 includes a barcode label 204 that is affixed to or printed directly onto the data cartridge 200. Although any type of machine-readable identifier that is external readable could be used, this embodiment uses a barcode identifier (BID). A human-readable alpha-numeric equivalent is also printed on the data cartridge 200. In one embodiment, the label could be replaced with a radio frequency identifier (RFID) tag that holds the BID or some equivalent identifier. In other embodiments, the barcode label 204 may be any form of standardized or proprietary printed, molded, embossed or holographic barcode including without limitation, 1-dimensional, 2-dimensional and 3-dimensional designs. Each BID is unique with respect to the population of data cartridges 200 that a particular cartridge library might encounter.

Figure 3:
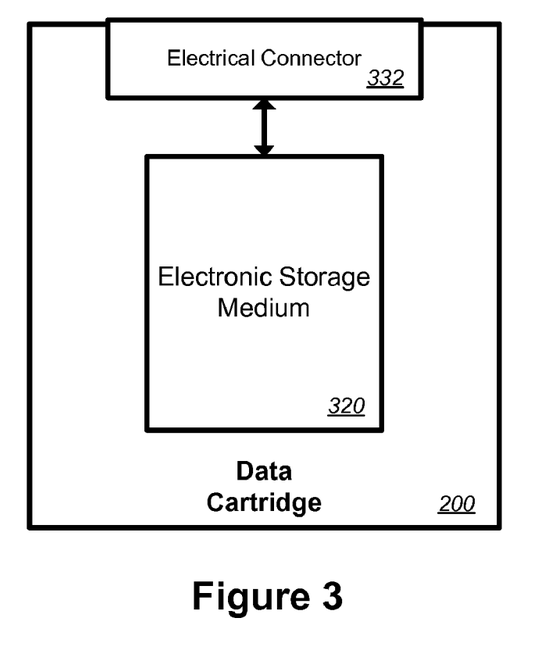
FIG. 3 depicts a block diagram of an embodiment of the data cartridge.

With reference to FIG. 3, a block diagram of an embodiment of the data cartridge 200 is shown. Each data cartridge 200 is electrically connected and in communication with the data storage system at all times while the data cartridge 200 is inserted in the system in this embodiment, but other embodiments could switch or inactivate the electrical connector 332. The data cartridge 200 is in a similar form factor as a tape cartridge to store data for archival or other purposes. A given data storage system could include a single data cartridge or many arranged in a library.

Located in the data cartridge 200 is an electronic storage medium 320 (e.g. a hard disk drive or flash memory) that is coupled to the data storage system by an electrical connector 200. The electronic storage medium 320 is formatted to permit the storage of both application data and metadata. Metadata is defined as information about the stored data and the data cartridge 200. One of the metadata elements is a BID field that provides an electronically-readable identification value for the data cartridge 200. The BID can be programmed and read by the data storage system at any time while the data cartridge 200 is present in the system.

The present embodiment of the data cartridge 200 is largely limited to the electronic storage medium 320, a housing, cabling, and an electrical connector 332. Other embodiments could have active circuits outside the electronic storage medium 320. For example, there could be one or more additional storage medium, status indicators and/or a display. In one embodiment, electronic paper is used to reprogrammably display the barcode label 204.

Figure 4:
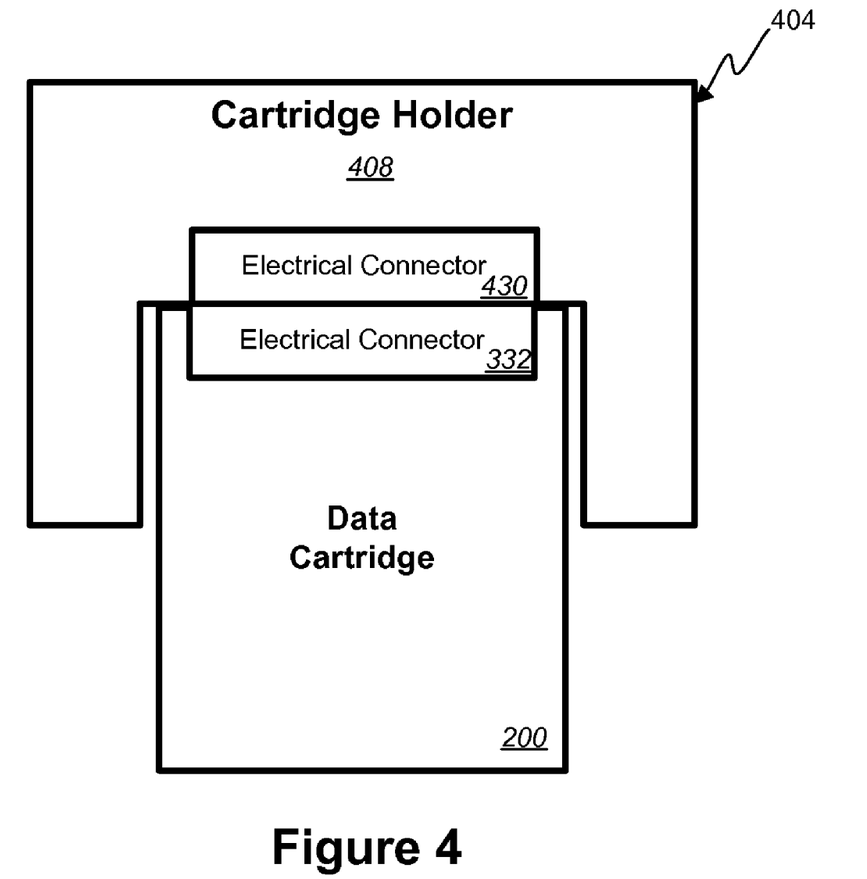
FIG. 4 depicts a block diagram of an embodiment of a cartridge holder coupled with a data cartridge.

Referring next to FIG. 4, a block diagram of an embodiment of a cartridge holder 408 coupled with the data cartridge 200 is shown. The cartridge holder 408 includes an electrical connector 430 to couple to a the mating electrical connector 332 of the data cartridge 200 and is also coupled with the data storage system to interact with the data cartridge 200. Power and data signals are provided through the electrical connector 430 to the data cartridge 200. An electrical specification such as SATA, PATA, SCSI, USB, FireWire, WUSB can be used in various embodiments to couple the data cartridge 200 to the cartridge holder 408. The data cartridge 200 is physically supported by the cartridge holder to maintain an electrical connection.

Figure 5A:
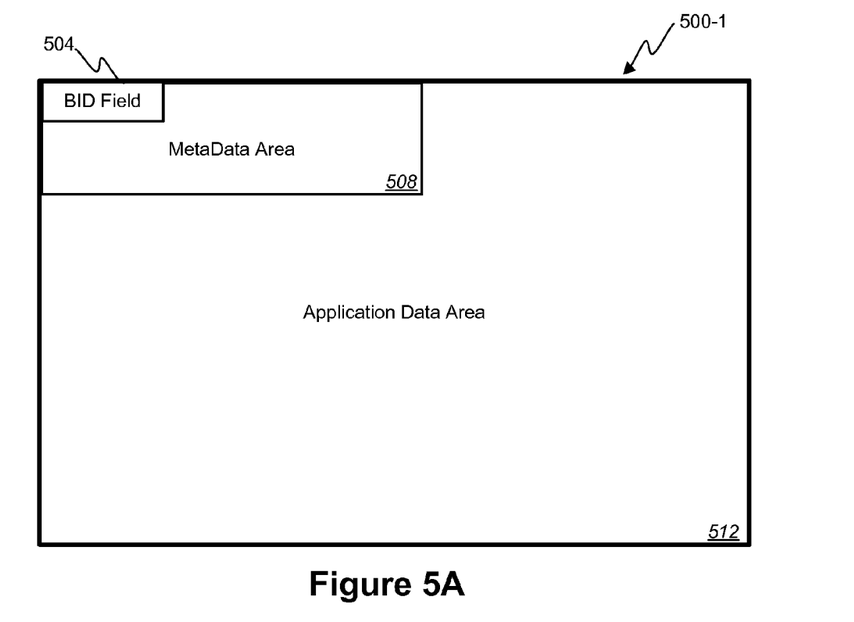
FIGS. 5A and 5B depict block diagrams of embodiments of a memory map for the data cartridges.

With reference to FIG. 5A, a block diagram of an embodiment of a memory map 500-1 for the data cartridge 200 is shown. The application data area 512 includes a metadata area 508, which holds a BID field 504. The BID field 504 holds the BID and is located in a particular physical or logical location in one embodiment. In another embodiment, the location of the BID field 504 is programmable. Once the BID field 504 is programmed, the BID serves as the data cartridge's identifier and is logically equivalent to a barcode label 204. In some cases, the BID could be the same as the barcode label, correlated through a look-up table, an encrypted or scrambled version, or a version that allows deriving the barcode label 204. In any event, the BID field can be read by the data storage system to find or determine the barcode label 204.

The BID field 504 may be pre-programmed into the data cartridge 200 at the time of manufacture or may be left intentionally blank. Once the data cartridge 200 has a barcode label affixed in the field, barcode label 204 is read manually or automatically. The numeric or alphanumeric BID is determined from what is read from the barcode label 204. The BID is stored in the BID field 504. The barcode label 204 can, at least partially, be recreated from the BID. Having the BID field 504 allows inventorying the data cartridges 200 in a data storage system by purely electronic means, without using an arm or machine reader.

Figure 5B:
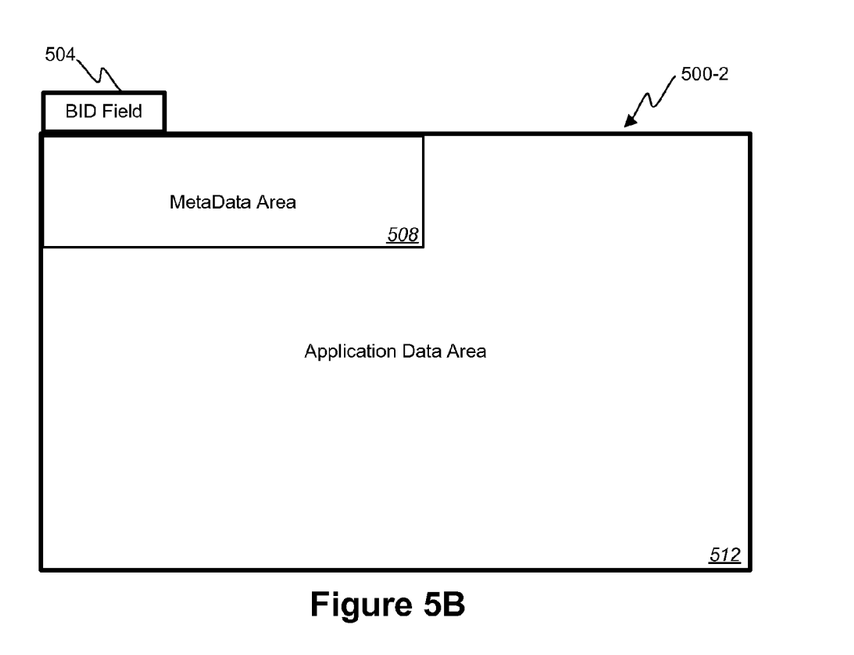

With reference to FIG. 5B, a block diagram of another embodiment of a memory map 500-2 for the data cartridge 200 is shown. This embodiment stores the BID field 504 outside of the application data area 512. For example, a hard drive could have a flash portion to store the BID field 504. The data cartridge 200 could include a separate memory outside the electronic storage medium 320 to hold the BID. In one embodiment, the BID field 504 is stored in an RFID chip, wired smart card or wireless smart card.

Figure 6A:
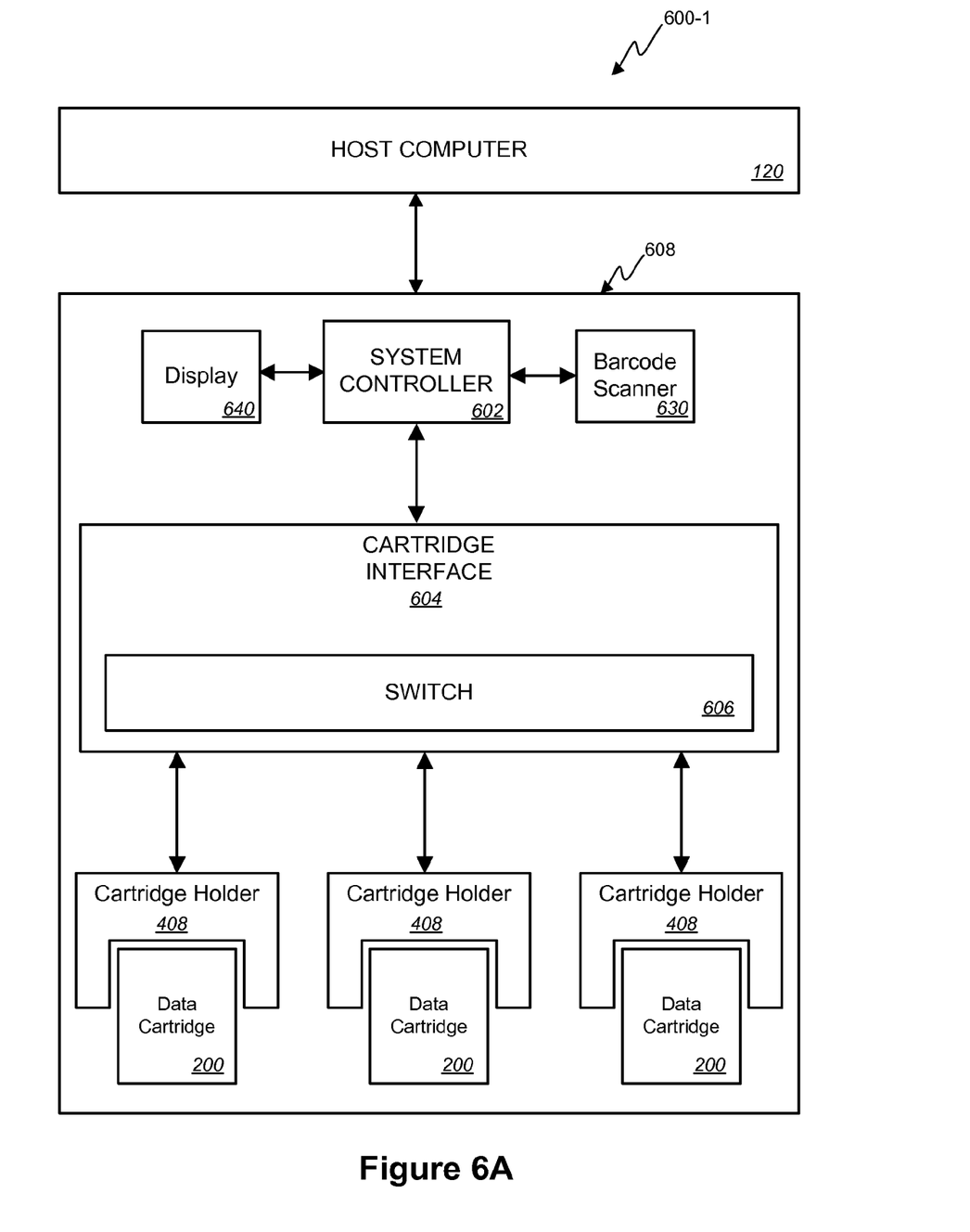
FIGS. 6A and 6B depict block diagrams of embodiments of a data storage system.

Referring next to FIG. 6A, a block diagram of an embodiment of a data storage system 600-1 is shown. The data storage system 600-1 includes a host computer 120 coupled to a switched cartridge library 608. Even though the switched cartridge library 608 uses data cartridges 200 in stead of tape cartridges, the host computer 120 uses standard interaction protocols such that this is masked.

The data storage system 600 employs an array of data cartridges 200 having a cartridge interface 604 coupled to the various cartridge holders 408. This embodiment shows capability for three data cartridges 200, but other embodiments could have any number of data cartridges in their separate holders 408. The cartridge interface 604 and its switch 606 eliminates the need for a robotic system to mechanically move multiple tape cartridges into a shared tape drive. The data storage system 600 allows each removable cartridge to be electrically connected and switchably in communication with a storage system controller 602 at any time that the cartridge is inserted in the data storage system 600.

The data storage system 600 can read the barcode labels 204 affixed to the data cartridges 200. The BID field is read and processed to surmise the barcode label 204. One embodiment describes performing the barcode reading feature without requiring a robotic mechanism to scan the data cartridges 200 in order to perform a cartridge inventory as explained further below.

A barcode scanner 630 is used in this embodiment to machine read the barcode label. Prompts, instructions and confirmations are presented on the display 640 to facilitate this process. This embodiment uses a barcode scanner 630 to machine-read the barcode label, but other embodiments could us any type of machine reader.

Figure 6B:
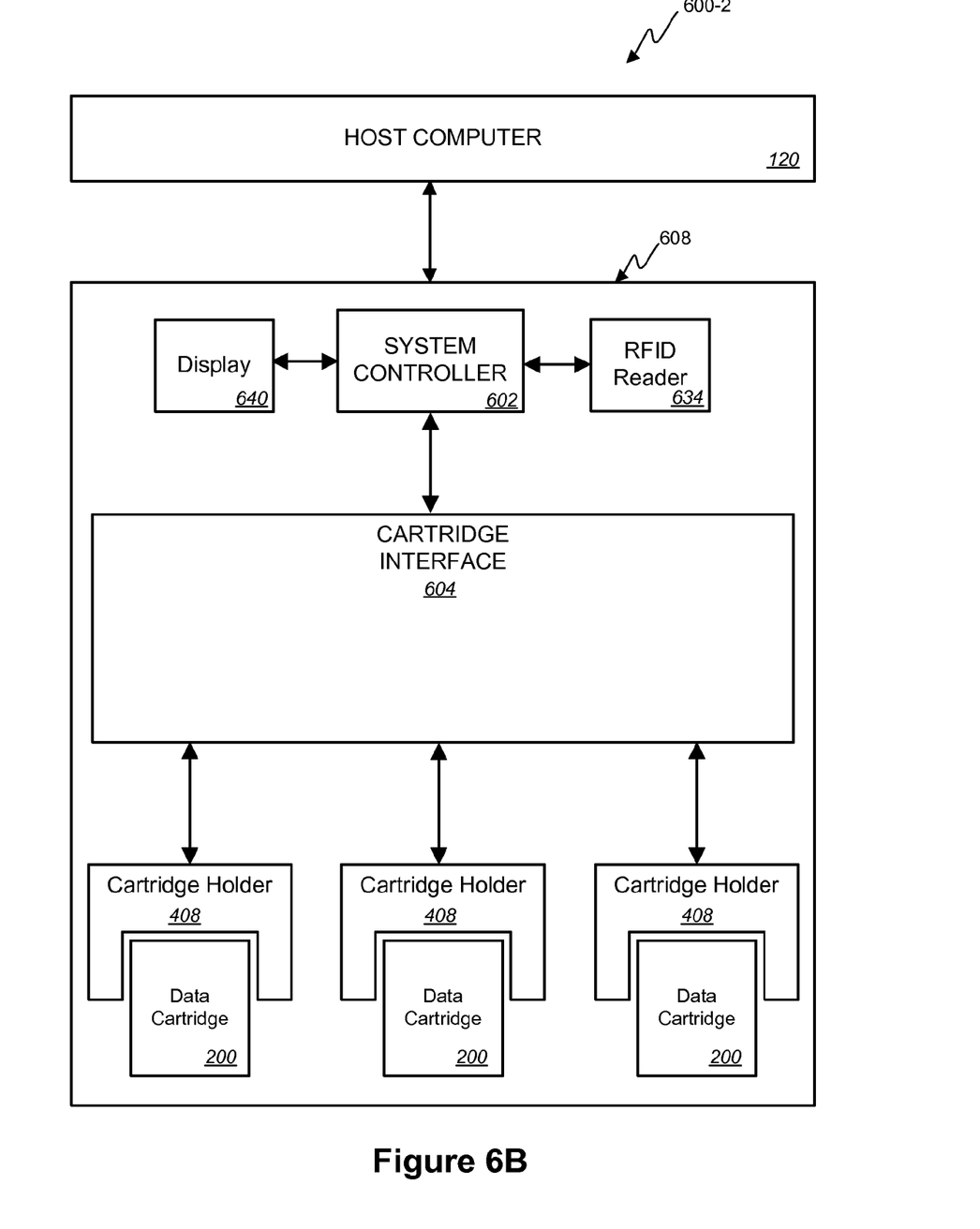

With reference to FIG. 6B, a block diagram of another embodiment of a data storage system 600-2 is shown. This embodiment doesn't use a switch in the cartridge interface 604. Each cartridge holder 408 is continually engaged with separate interfaces that can independently operate in parallel rather than in a switched fashion as in FIG. 6A. This embodiment uses a RFID reader 634 to machine-read the label of the data cartridge 200.

Figure 7A:
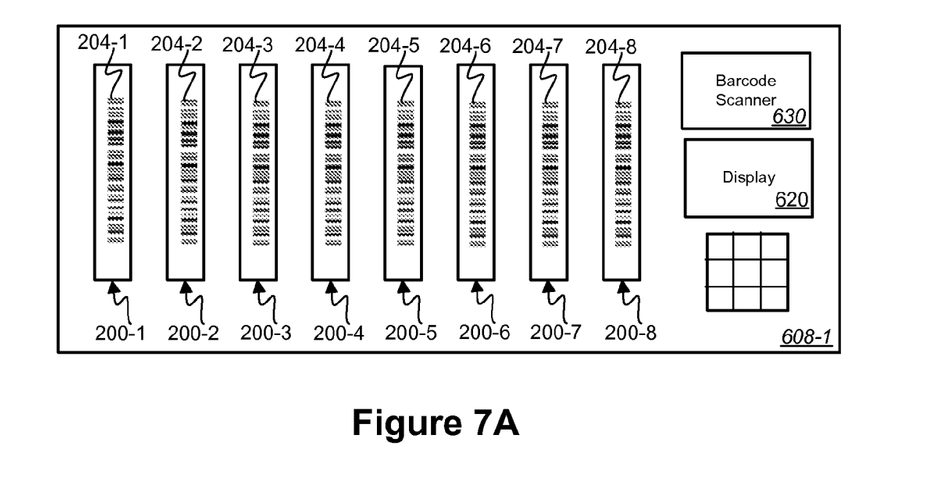
FIGS. 7A and 7B depict block diagrams of embodiments of a switched cartridge library.

Referring next to FIG. 7A, a block diagram of an embodiment of a switched cartridge library 608-1 is shown. The switched cartridge library 608-1 contains somewhere on its front panel an optical barcode scanner 630, which can use an off-the-shelf component in one embodiment. The optical scanner 630 may be flush mounted in the front panel or may be implemented as a retractable wand. The optical scanner 630 is electrically coupled to and controlled by the system controller 602. Also located on the front panel is a display 620 (e.g., LED, LCD, OLED), a set of navigation keys for menu selection and data entry, and possibly, an audible indicator.

The front panel has one or more cartridge holders 408, which may be partially or wholly populated with data cartridges 200. This embodiment shows eight populated cartridge holders 408. Each of the data cartridges 200 includes a barcode label 204 in this embodiment. Each barcode label 204 of each data cartridge 200 can be manually scanned with the barcode scanner 630.

Figure 7B:
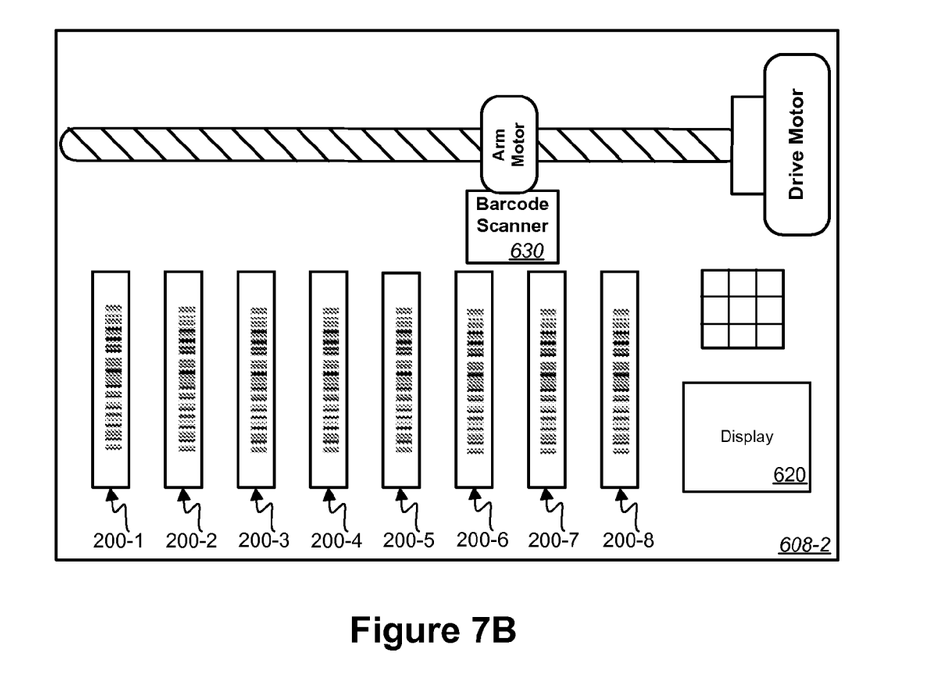

With reference to FIG. 7B, a block diagram of another embodiment of a switched cartridge library 608-2 is shown. This embodiment has a barcode scanner 630 mounted on a robotic arm. The barcode scanner 630 is moved back and forth to read each barcode label 204 for each data cartridge 200. In this way, this embodiment can automatically scan each data cartridge and report the BID to the cartridge interface 604 for programming in each BID field 504 of each respective data cartridge 200. Whenever a new data cartridge 200 is sensed, the robotic arm moves to the data cartridge 200 and reads the BID.

Figure 8:
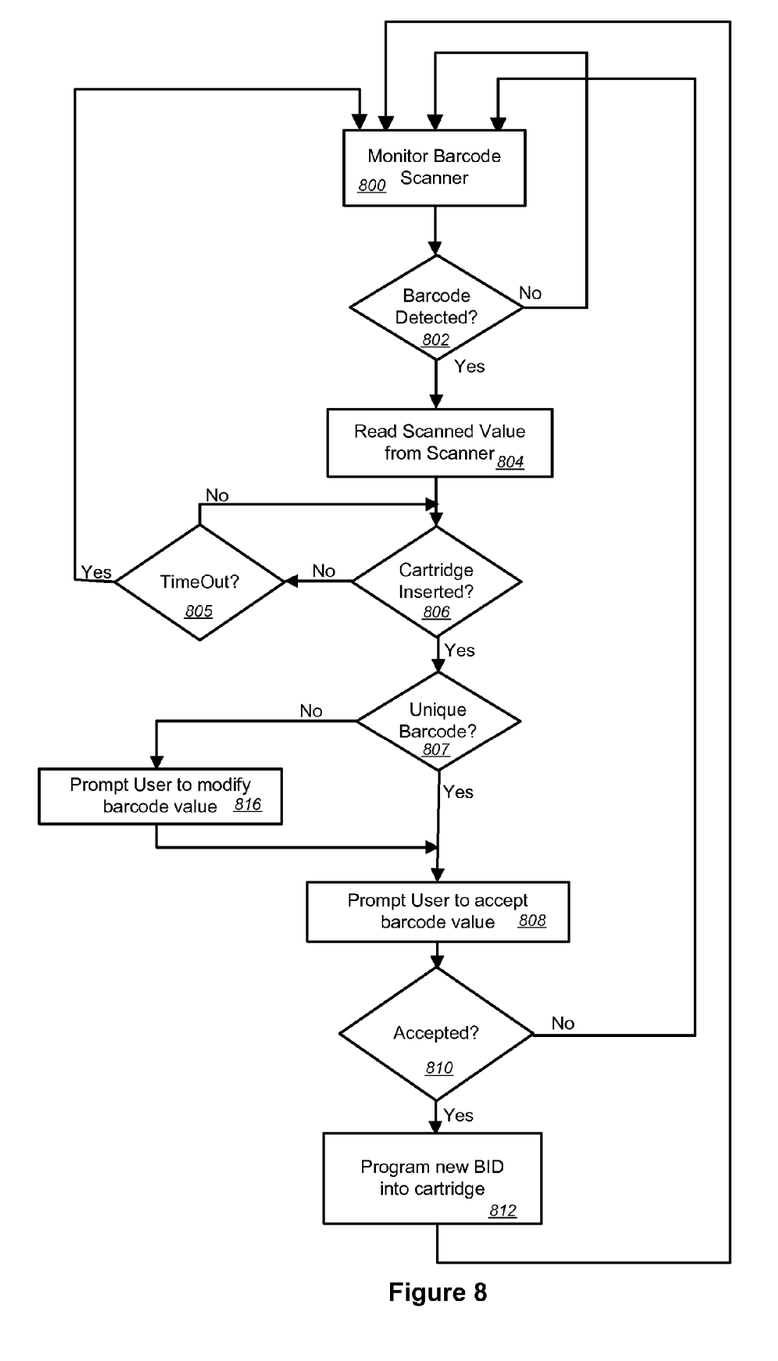
FIG. 8 illustrates a flow chart of an embodiment of a process for reprogramming a barcode identifier (BID)

Referring next to FIG. 8, a flow chart of an embodiment of a process for programming a BID field 504 is illustrated. Before a new data cartridge 200 is inserted into the switched cartridge library 608 for the first time, the user manually passes the cartridge barcode label 204 (if one is affixed) past the optical scanner 630 mounted on the front panel. In block 800, the barcode scanner 630 is always looking for a barcode label 204 to read. Alternatively, the barcode scanner 630 might be activated by a menu or button if it is powered down or in a sleep mode. If no barcode label 204 is read as determined in block 802, processing loops back to block 800. At the completion of a scan, the optical scanner 630 signals the system controller 602 that a scan has occurred.

The data storage system 600 reads the output of the barcode scanner 630 in block 804. In block 806, the data storage systems 600 monitors the cartridge holders to determine if a new cartridge 200 has been inserted into an empty slot. If a new cartridge 200 is not inserted before a timeout condition occurs as determined in block 805, the scanned value is discarded and processing loops back to block 800. If a cartridge is inserted, processing proceeds from block 806 to block 807 to determine if the scanned value is already present in one of the other cartridges 200 already loaded in cartridge holders. If the scanned value is not unique, processing branches to block 816 where the user is notified of the duplication and prompted to enter a new value.

With a newly encountered BID or newly entered value, processing continues to block 808 where the BID is presented on the display 640 (and possibly beep the audible indicator) to notify the user that the scan has been successfully completed. The BID could be a numerical or alphanumerical value. The user can accept or edit the BID value in this embodiment. A message on the display 640 confirms with the user the slot that the scanned cartridge is being inserted into so that the cartridge library 608 can correlate the scan to the specific data cartridge 200. The display 640 may indicate the slot to use in some embodiments. Where the user doesn't accept the BID in block 810, processing loops back to block 800. Once confirmed, the system controller 602 electronically stores the BID value in the BID field 504 of the cartridge metadata 508 in block 812. The BID value is now permanently stored in the data cartridge 200 and may be read electronically at any time without rescanning the barcode label 204.

The optical scanning process need not be repeated when the data cartridge 200 is inserted again (into the same or different system) since the BID value is maintained even after the data cartridge 200 has been removed from the system 600. However, the barcode label 204 may be scanned and reprogrammed at any time in this embodiment. This may be done if the label is changed, for example.

In some cases, cartridges 200 may be shipped to the customer with barcode labels already affixed and the BID fields 504 already programmed so that the user does not have to perform the manual scanning step when first inserting the cartridge. In other cases, the cartridge 200 may be pre-programmed at the factory with a unique BID value even if there is no label affixed. This may provide a default electronic identifier for the data cartridge 200. In some cases, the data cartridge 200 may come with a unique value printed onto the barcode label 204 of the data cartridge 200 at the time of manufacture (e.g., by laser or ink-jet printer right onto the cartridge shell). This pre-printed identifier would correspond to the pre-programmed BID value. This provides both an electronic-readable and human- and/or machine-readable identifier even though no barcode label 204 is affixed. If a barcode label 204 is then later affixed over the pre-printed identifier, the normal manual scanning operation described above can be performed to overwrite the BID with the new value.

A pre-programmed, pre-printed BID value on the barcode label 204 may be globally unique using a controlled numbering system large enough to never require reuse of an identifying value in one embodiment. In this way, no two cartridges 200 can ever have the same identifying value. Different manufacturers of data cartridges 200 could coordinate their identifying values to prevent reuse.

Figure 9:
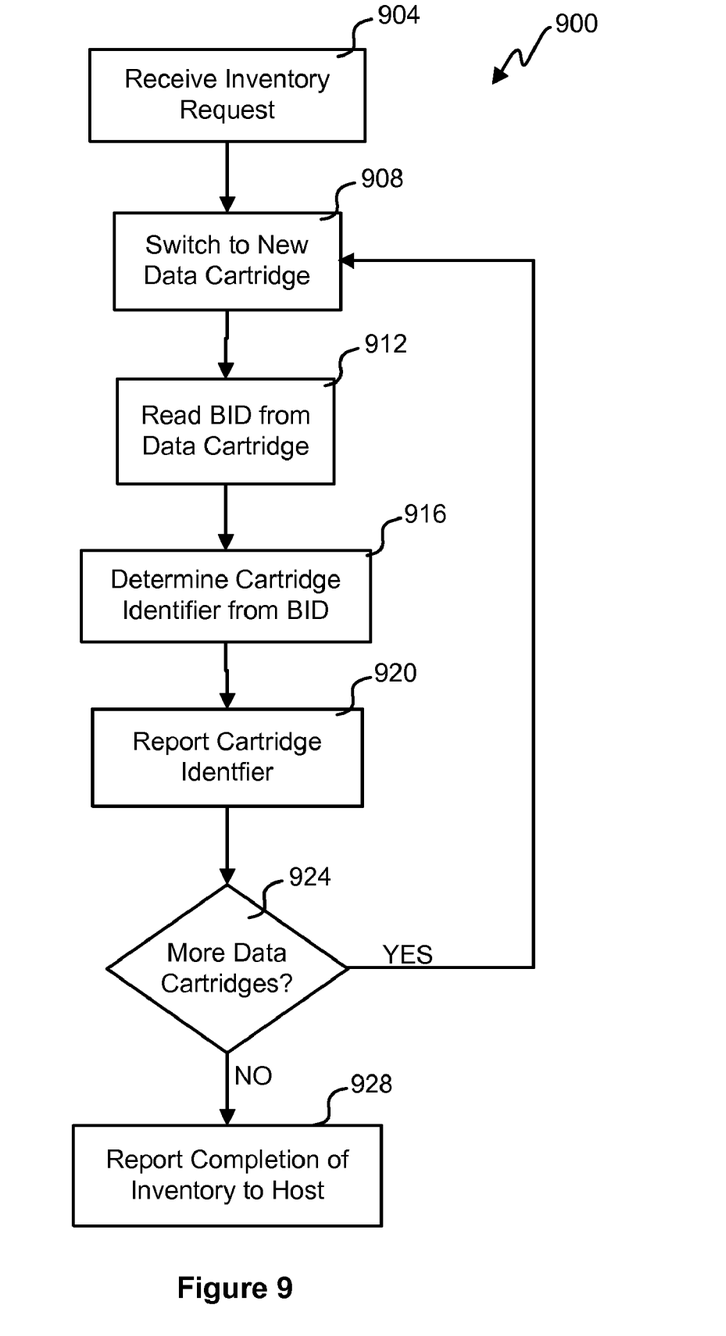
FIG. 9 illustrates a flowchart of an embodiment of a process for inventorying a cartridge library.

With reference to FIG. 9, a flowchart 900 of an embodiment of a process for inventorying a cartridge library 608 is illustrated. With each data cartridge 200 having its BID value stored and readable electronically, the data storage system 600 may perform an inventory operation at any time (e.g., after power-on initialization or upon receipt of an inventory/audit command by the host computer system 120). This inventory operation is a purely electronic process of reading the metadata BID field 504 from the installed cartridges 200 and associating the BID values with physical or logical cartridge locations in the cartridge library 608. This has the advantage of completing an inventory very rapidly compared to robotic systems which must mechanically move the scanner past each cartridge.

The depicted portion of the process begins in block 904 where an inventory request is received by the switched cartridge library 608 from the host computer 120. In a loop including blocks 908, 912, 916, 920 and 924, each of the data cartridges 200 are read in succession. In block 908, an unread data cartridge 200 is engaged by the switch 606 or logically engaged for embodiments that can read and write all data cartridges 200 simultaneously. In block 912, the BID field 504 is electronically read from the metadata area 508 of the current data cartridge 200.

In block 916, the cartridge identifier or barcode label 204 is determined from the BID. The barcode label 204 could be the same as the BID or some function of the BID or a reformatted BID in various embodiments. The cartridge identifier is reported back to the host computer for the current cartridge location in block 920. Where there are additional un-inventoried cartridges as determined block 924, processing loops back to block 908 to inventory the remaining data cartridges 200. Where there are no more data cartridges 200 as determined in block 924, processing proceeds to block 928 where the cartridge library 608 indicates to the host computer 120 that the inventory is complete. Some embodiments may slow down the inventory process to more accurately model the delay likely to be experienced in a system with mechanical scanning.

One advantage of this embodiment is that the system controller 602 can see the values of the BIDs of all the data cartridges 200 loaded into the cartridge library 608 at any one time and may prevent duplicate values from confusing an application on the host computer 120. If a data cartridge 200 with a duplicate value is inserted into the library 608, the system controller 602 may notify the user through the front panel interface, on-line management interface or error message back to the host application that a duplication exists and request or require corrective action. Some embodiments could detect duplicates and automatically change BIDs to remove redundancy.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques described above may be done in various ways. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A method for electronically identifying a removable data cartridge, the method comprising steps of:
    reading a first identifier from the removable data cartridge;
    accepting a second identifier while the removable data cartridge is in the field, wherein the second identifier corresponds to a marking on the removable data cartridge and is different than the first identifier;
    programming data representative of the second identifier into the removable data cartridge after the accepting step;
    reading the data representative of the second identifier from the removable data cartridge; and
    conveying information related to the second identifier or the marking to a host computing device or display.

2. The method for electronically identifying the removable data cartridge as recited in claim 1, further comprising steps of:
    receiving a command from the host computing device to provide data representative of the marking on the removable data cartridge;
    determining the data representative of the marking using the programmed data representative of the second identifier; and
    wherein the conveying step includes responding to the command with a response, wherein the response provides the data representative of the marking to the host computing device.

3. The method for electronically identifying the removable data cartridge as recited in claim 1, wherein the second-listed reading step comprises a step of reading the second identifier in a randomly-accessible fashion.

4. The method for electronically identifying the removable data cartridge as recited in claim 1, wherein the second identifier replaces the first identifier in identifying the removable data cartridge.

5. The method for electronically identifying the removable data cartridge as recited in claim 1, wherein the first-listed reading step is performed by a machine-operated reader.

6. The method for electronically identifying the removable data cartridge as recited in claim 1, wherein the first-listed reading step is performed by a bar code scanner.

7. The method for electronically identifying the removable data cartridge as recited in claim 1, wherein:
    the first-listed reading step comprises a step of reading the first identifier from memory outside the removable data cartridge, and
    the second-listed reading step comprises a step of reading the second identifier from memory within the removable data cartridge.

8. The method for electronically identifying the removable data cartridge as recited in claim 1, further comprising steps of:
    determining that the second identifier is duplicative with another identifier in use; and
    requesting entry of a different identifier to use as the second identifier prior to the programming step.

9. The method for electronically identifying the removable data cartridge as recited in claim 1, further comprising a step of marking the removable data cartridge with a machine readable marking corresponding to at least one of the first identifier or the second identifier.

10. A machine adapted to perform the machine-implementable method for electronically identifying the removable data cartridge of claim 1.

11. A machine-readable medium having machine-executable instructions recorded thereon for performing the machine-implementable method for electronically identifying the removable data cartridge of claim 1.

12. A removable data cartridge with electronic identification, the removable data cartridge comprising:
   an enclosure;
   an electronic storage medium attached to the enclosure;
   a machine-readable identifier, the electronic storage medium stores an electronic identifier that correlates to the machine-readable identifier; and
   an electrical interface, wherein:
     the electrical interface is configured to pass the electronic identifier,
     the electronic storage medium is electrically coupled with the electrical interface,
     the electronic storage medium is configured to receive power with the electrical interface, and
     the electronic identifier is field programmable to allow changes to the electronic identifier, according to the machine-readable identifier being changed.

13. The removable data cartridge with electronic identification as recited in claim 12, wherein the electronic storage medium is chosen from the group consisting of a hard drive and a flash drive.

14. The removable data cartridge with electronic identification as recited in claim 12, wherein the electronic identifier is randomly accessible.

15. The removable data cartridge with electronic identification as recited in claim 12, wherein the machine-readable identifier comprises a bar code.

16. The removable data cartridge with electronic identification as recited in claim 12, wherein the machine-readable identifier comprises a radio frequency identification (RFID) tag.

17. The removable data cartridge with electronic identification as recited in claim 12, further comprising a machine reader that reads the new machine-readable identifier, wherein the new machine-readable identifier is automatically written to the electronic identifier.

18. A method for electronically providing identification of a removable data cartridge, the method comprising steps of:
   providing an identifier for the removable data cartridge;
   receiving a command to provide data representative of a machine-readable marking on the removable data cartridge;
   reading data representative of the identifier from within the removable data cartridge;
   determining the data representative of the machine-readable marking using the data representative of the identifier;
   responding to the command with a response, wherein the response provides the data representative of the machine-readable marking;
   accepting a second identifier while the removable data cartridge is in the field, wherein the second identifier corresponds to another marking on the removable data cartridge, the another marking being different than the machine readable marking; and
   programming data representative of the second identifier into the removable data cartridge after the accepting step.

19. The method for electronically providing identification of the removable data cartridge as recited in claim 18, further comprising:
   reading the data representative of the second identifier from the removable data cartridge.

20. The method for electronically providing identification of the removable data cartridge as recited in claim 18, further comprising steps of:
   reading the machine-readable marking from outside the removable data cartridge, and
   determining the identifier from the machine-readable marking.

21. The method for electronically providing identification of the removable data cartridge as recited in claim 18, wherein the machine-readable marking is the same as the identifier.

22. The method for electronically providing identification of the removable data cartridge as recited in claim 18, wherein the reading step comprises a step of reading the identifier in a randomly-accessible fashion.

23. A machine adapted to perform the machine-implementable method for electronically providing identification of the removable data cartridge of claim 18.

24. A machine-readable medium recorded thereon having machine-executable instructions for performing the machine-implementable method for electronically providing identification of the removable data cartridge of claim 18.

* * * * *